(12) United States Patent
Yang

(10) Patent No.: US 9,915,115 B2
(45) Date of Patent: Mar. 13, 2018

(54) PETROLEUM INSTRUMENT SALVAGING CONNECTOR AND PETROLEUM INSTRUMENT

(71) Applicant: Beijing Hailan Science & Technology Development Co., Ltd., Beijing (CN)

(72) Inventor: Biao Yang, Beijing (CN)

(73) Assignee: Beijing Hailan Science & Technology Development Co., Ltd., Beijing (CN)

( * ) Notice: Subject to any disclaimer, the term of this patent is extended or adjusted under 35 U.S.C. 154(b) by 261 days.

(21) Appl. No.: 14/919,669

(22) Filed: Oct. 21, 2015

(65) Prior Publication Data
US 2016/0115758 A1 Apr. 28, 2016

(30) Foreign Application Priority Data
Oct. 23, 2014 (CN) .......................... 2014 1 0574971

(51) Int. Cl.
| | | |
|---|---|---|
| E21B 31/12 | (2006.01) | |
| E21B 23/14 | (2006.01) | |
| F16B 7/22 | (2006.01) | |

(52) U.S. Cl.
CPC ................ *E21B 23/14* (2013.01); *F16B 7/22* (2013.01)

(58) Field of Classification Search
CPC .......... E21B 31/12; E21B 23/14; E21B 31/20; F16B 45/06
USPC .... 294/86.12, 86.24, 86.33; 166/98, 99, 301
See application file for complete search history.

(56) References Cited

U.S. PATENT DOCUMENTS

| 1,726,218 A | * | 8/1929 | Fry ......................... | E21B 31/20 |
| | | | | 294/86.2 |
| 3,550,684 A | * | 12/1970 | Cubberly, Jr. .......... | E21B 23/14 |
| | | | | 166/254.2 |
| 4,084,636 A | * | 4/1978 | Burge ....................... | E21B 4/02 |
| | | | | 166/66.5 |

(Continued)

FOREIGN PATENT DOCUMENTS

CN     104405323 A     3/2015

*Primary Examiner* — Kenneth L Thompson
(74) *Attorney, Agent, or Firm* — Foley & Lardner LLP; Antoinette F. Konski

(57) ABSTRACT

The present invention discloses a petroleum instrument salvaging connector, which is set on a salvage end of a petroleum instrument, for being in hooking fit with a salvaging head of a petroleum instrument salvaging device. The petroleum instrument salvaging connector comprises a salvaging connector body (11); the salvaging connector body (11) has a stair-shaped salvaging hole; the stair-shaped salvaging hole is a blind hole and comprises a large-caliber section (111) and a small-caliber section (112); the large-caliber section (111) is located at the bottom of the stair-shaped salvaging hole, and a hooking face (113) facing the bottom of the large-caliber section (111) is formed at the jointing part between the large-caliber section (111) and the small-caliber section (112); and a sand outlet (116) is set at the bottom of the sidewall of the large-caliber section (111). The invention further discloses a petroleum instrument. By employing the above solutions, the problem in the current drilling process may be solved that the salvaging head cannot be in hooking fit with the petroleum instrument salvaging connector due to the deposition of solid particles in the slurry in the stair-shaped salvaging hole of the petroleum instrument salvaging connector.

7 Claims, 2 Drawing Sheets

(56) References Cited

U.S. PATENT DOCUMENTS

| | | | | |
|---|---|---|---|---|
| 5,775,433 A * | 7/1998 | Hammett | ............... | E21B 17/06 |
| | | | | 166/381 |
| 6,095,583 A * | 8/2000 | Beeman | ................. | E21B 31/18 |
| | | | | 294/86.15 |
| 6,997,493 B2 * | 2/2006 | Beach | ..................... | E21B 31/18 |
| | | | | 294/86.27 |
| 7,278,476 B1 * | 10/2007 | Burdette | ............... | E21B 17/07 |
| | | | | 166/105.2 |
| 8,746,340 B2 * | 6/2014 | Mashburn | ............ | E21B 21/002 |
| | | | | 166/205 |
| 2012/0118560 A1 * | 5/2012 | Mikalsen | ............... | E21B 31/18 |
| | | | | 166/99 |
| 2016/0115756 A1 * | 4/2016 | Yang | ..................... | E21B 31/20 |
| | | | | 166/67 |
| 2016/0115757 A1 * | 4/2016 | Yang | ..................... | E21B 31/20 |
| | | | | 166/75.11 |

* cited by examiner

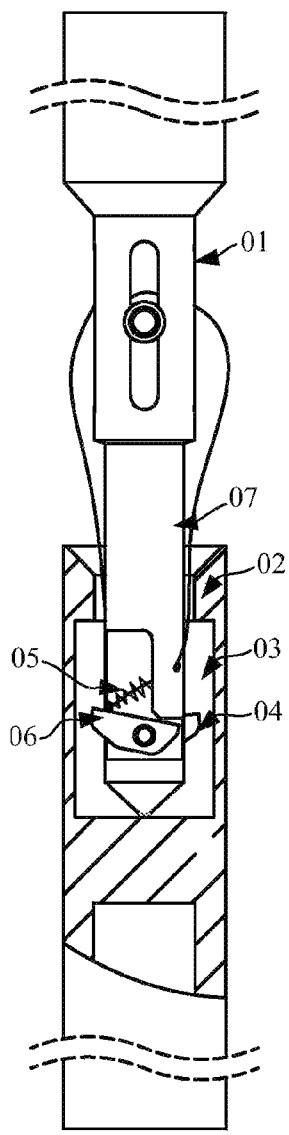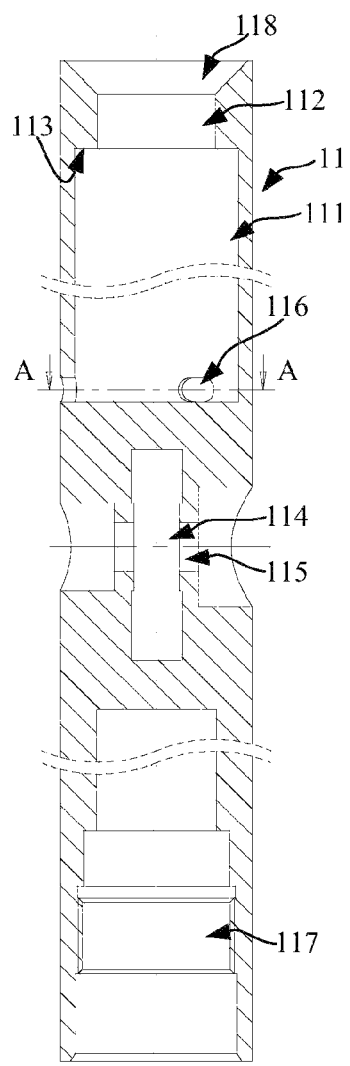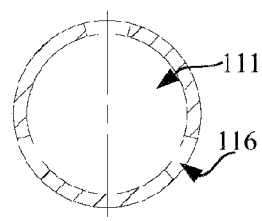
FIG. 3
FIG. 2
FIG. 1

PETROLEUM INSTRUMENT SALVAGING CONNECTOR AND PETROLEUM INSTRUMENT

CROSS-REFERENCE TO RELATED APPLICATION

The present application claims priority of Chinese Patent Application No. 201410574971.7, filed Oct. 23, 2014, the content of which is incorporated herein by reference in its entirety.

FIELD OF THE INVENTION

The present invention relates to the field of petroleum instrument salvaging technologies, and in particular, to a petroleum instrument salvaging connector and a petroleum instrument.

BACKGROUND OF THE INVENTION

During petroleum drilling, as the drill rod of a drilling device strikes into the earth gradually, a petroleum instrument (for example, inclinometer) set in the chamber of the drill rod will transmit the detected data to the ground successively, thereby the subsequent processing on the detected data may be realized by a ground device. As the drilling depth increases gradually, the position of the petroleum instrument will be deeper and deeper. It is known that the environment inside a drilling well is severe and it is harmful to the petroleum instrument. Therefore, it often occurs that the petroleum instrument is damaged; correspondingly, it also often occurs that the petroleum instrument is examined and repaired or replaced.

Generally, the petroleum instrument is placed on a base in the chamber of the drill rod. At present, once the petroleum instrument is damaged, it will be required that the drill rods should be pulled out of the drilling well, that is, the drill rods should be salvaged one by one, until the drill rod in which the petroleum instrument exists is salvaged, and then the petroleum instrument is replaced or examined and repaired. After the petroleum instrument is replaced or examined and repaired, it needs to be reinstalled into the corresponding probe, and then each drill rod should be reconnected to successively lower the drill rod into the drilling well. During the above process, the drill rods need to be disassembled and mounted one by one, thus there exist problems of large labor intensity, low efficiency and high cost, etc. Therefore, the present inventor provides a petroleum instrument salvaging system and a petroleum instrument hoisting system in the corresponding patent application. Wherein, by employing the petroleum instrument salvaging system and the petroleum instrument hoisting system, the salvaging and hoisting of a petroleum instrument can be realized respectively in the chamber of the drill rod, without pulling the drill rods out of the drilling well, thereby the problems of large labor intensity, low efficiency and high cost, etc., in the current mode of pulling the drill rods out of the drilling well may be solved.

During salvaging, the salvaging head of the petroleum instrument salvaging system is lowered along the chamber of the drill rod as driven by a lifting rope, then it will be in hooking fit with the petroleum instrument salvaging connector, and finally the whole petroleum instrument is driven to rise out of the drilling well, thereby realizing the salvaging of the petroleum instrument. Generally, the petroleum instrument salvaging connector has a stair-shaped salvaging hole, and the petroleum instrument salvaging head can be hooked on the stair-shaped face of the stair-shaped salvaging hole, thus it can be in hooking fit with the petroleum instrument salvaging connector. Referring to FIG. 1, it is a schematic diagram showing the salvaging of a petroleum instrument provided in one corresponding patent application of the present inventors. The insertion rod 07 of the salvaging head 01 is set with two clamping pieces (clamping piece 04 and clamping piece 06), which are both hinged to the insertion rod 07 and will be in a retracted state when passing, along with the insertion rod 07, through a hole section of the stair-shaped salvaging hole 03 that has a small diameter. When the two clamping pieces completely enter the a hole section of the stair-shaped salvaging hole 03 that has a large diameter, they will be in an unfolded state under the action of a compression spring 05, and finally the two clamping pieces can be in hooking fit with the stair-shaped face of the stair-shaped salvaging hole 03 under the action that the lifting rope lifts the salvaging head 01, thereby the hooking of the salvaging head 01 and the petroleum instrument salvaging connector 02 is realized.

It is known that, during petroleum drilling, a drilling head is generally driven by the slurry to rotate so as to realize the drilling of the drilling head. During the process in which the slurry is delivered to the drilling head along the cavity of the drill rod, when the slurry passes through the gap between the petroleum instrument and the inner wall of the drill rod, solid particles in the slurry may enter the stair-shaped salvaging hole of the petroleum instrument salvaging connector 02, and finally the solid particles may be deposited in the stair-shaped salvaging hole 03 deeper and deeper, or even cover the stair-shaped face of the stair-shaped salvaging hole 03. In this case, it is very difficult for the insertion rod 07 of the salvaging head 01 to enter the stair-shaped salvaging hole 03 together with the two clamping pieces, thus the two clamping pieces cannot be in the unfolded state in which they are in hooking fit with the stair-shaped face of the stair-shaped salvaging hole 03. As a result, it will be unable to salvage the petroleum instrument, and the replacing or repairing of the petroleum instrument will be seriously influenced.

SUMMARY OF THE INVENTION

In one aspect of the invention, there provides a petroleum instrument salvaging connector, thereby solving the problem in the current drilling process that the salvaging head cannot be in hooking fit with the petroleum instrument salvaging connector due to the deposition of solid particles in the slurry in the stair-shaped salvaging hole of the petroleum instrument salvaging connector.

In order to solve the above technical problem, the invention provides the following technical solutions:

A petroleum instrument salvaging connector, which is set on a salvage end of a petroleum instrument, for being in hooking fit with a salvaging head of a petroleum instrument salvaging device;

The petroleum instrument salvaging connector comprises a salvaging connector body;

The salvaging connector body has a stair-shaped salvaging hole; the stair-shaped salvaging hole is a blind hole and includes a large-caliber section and a small-caliber section;

The large-caliber section is located at the bottom of the stair-shaped salvaging hole, and a hooking face facing the bottom of the large-caliber section is formed at the jointing part between the large-caliber section and the small-caliber section;

A sand outlet is set at the bottom of the sidewall of the large-caliber section.

Preferably, in the above petroleum instrument salvaging connector, the number of the sand outlets is greater than one, and the sand outlets are distributed uniformly on the circumference of the large-caliber section.

Preferably, in the above petroleum instrument salvaging connector, the sand outlet is a strip-shaped hole.

Preferably, in the above petroleum instrument salvaging connector, the petroleum instrument salvaging connector further includes a pulley, which is set on the salvaging connector body, for fitting a lifting rope to assist the salvaging or hoisting of the petroleum instrument, and the wheel rim of the pulley has a groove for being passed through by the lifting rope.

Preferably, in the above petroleum instrument salvaging connector, the pulley is made of a beryllium copper material.

Preferably, in the above petroleum instrument salvaging connector, the number of the pulley is one, an accommodation hole is set on the salvaging connector body, and the pulley is located in the accommodation hole, and the opposite parts on both sides of the wheel rim thereof extend outside the accommodation hole.

Preferably, in the above petroleum instrument salvaging connector, the distance from the wheel rim of the pulley to the bottom end of the accommodation hole is greater than the distance to the top end of the accommodation hole.

In another aspect of the invention, there further provides a petroleum instrument, which includes any one of the above petroleum instrument salvaging connectors.

In the petroleum instrument salvaging connector according to the invention, by setting a sand outlet at the bottom of the sidewall of a large-caliber section at the bottom of the stair-shaped salvaging hole, the slurry that enters the stair-shaped salvaging hole during a drilling process will be discharged, and solid particles deposited in the stair-shaped salvaging hole can be discharged due to the impact effect of the slurry discharge, thereby it can be avoided that solid particles are deposited gradually in the stair-shaped salvaging hole. Thus, it may be seen that, by employing the petroleum instrument salvaging connector according to the invention, the problem in the current drilling process can be solved that the salvaging head cannot be in hooking fit with the petroleum instrument salvaging connector due to the deposition of solid particles in the slurry in the stair-shaped salvaging hole of the petroleum instrument salvaging connector.

BRIEF DESCRIPTION OF THE DRAWINGS

In order to more clearly illustrate the technical solutions in the embodiments of the invention, the drawings needed in the description of the embodiments will be briefly introduced below. Apparently, other drawings may also be obtained by one of ordinary skills in the art according to these drawings without creative work.

FIG. 1 is a schematic diagram showing the salvaging of a petroleum instrument by a petroleum instrument salvaging system;

FIG. 2 is a structural representation of the salvaging connector body of a petroleum instrument salvaging connector according to one embodiment of the invention;

FIG. 3 is a sectional view of FIG. 2 in direction A-A; and

Figure 4:
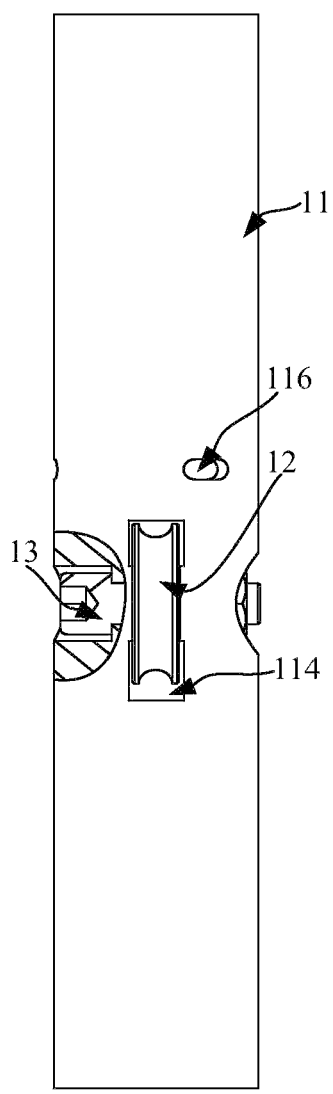
FIG. 4 is a structural representation of a petroleum instrument salvaging connector according to one embodiment of the invention.

In the above FIG. 1-FIG. 4:

Salvaging Head 01, Petroleum Instrument Salvaging Connector 02, The Stair-Shaped Salvaging Hole 03, Clamping Piece 04, Compression Spring 05, Clamping Piece 06, Insertion Rod 07;

Salvaging Connector Body 11, Pulley 12, Screw-Threaded Connecting Member 13;

Large-caliber section 111, Small-caliber section 112, Hooking Face 113, Accommodation Hole 114, Through hole 115, Sand Outlet 116, Module Mounting Hole 117, Coniform Opening 118.

DETAILED DESCRIPTION OF THE EMBODIMENTS

One embodiment of the invention provides a petroleum instrument salvaging connector, thereby the problem in the current drilling process may be solved that the salvaging head cannot be in hooking fit with the petroleum instrument salvaging connector due to the deposition of solid particles in the slurry in the stair-shaped salvaging hole of the petroleum instrument salvaging connector.

In order to make one skilled in the art better understand the technical solutions in the embodiments of the invention and to make the above objects, characteristics and advantages of the embodiments of the invention more apparent, the technical solutions in the embodiments of the invention will be further illustrated in detail in conjunction with the drawings.

One embodiment of the invention provides a petroleum instrument salvaging connector. The petroleum instrument salvaging connector provided is set on a salvage end of a petroleum instrument as a part of the petroleum instrument. The petroleum instrument salvaging connector according to the embodiment of the invention is used for being in hooking fit with a salvaging head of a petroleum instrument salvaging device, thereby realizing the salvaging of the petroleum instrument. Specifically, for the process in which the petroleum instrument salvaging connector fits the salvaging head of petroleum instrument salvaging device so as to implement salvaging, reference may be made to the description of the corresponding part of the background technology, and no further description will be given again here.

Referring to FIGS. 2 and 3, the petroleum instrument salvaging connector according to the embodiment of the invention includes a salvaging connector body 11, which is the main body part of the whole salvaging connector and is also the mounting base of other ancillary attachments. Because the environment under a drilling well is severe, serious corrosion will occur on the devices. Therefore, the salvaging connector body 11 is preferably made of a metal material. More preferably, the salvaging connector body 11 is made of a metal with good corrosion resistance. During the hoisting or salvaging of a petroleum instrument, the petroleum instrument may impact the inner wall of chamber of the drill rod, thus spark may be generated, which apparently is a severe hidden danger. Therefore, in the embodiment of the invention, the salvaging connector body 11 is preferably made of a beryllium copper material, which can eliminate the generation of sparks due to impact.

The salvaging connector body 11 has a stair-shaped salvaging hole. The stair-shaped salvaging hole is a blind hole, and it includes a large-caliber section 111 and a small-caliber section 112. Generally, the cross section of the stair-shaped salvaging hole (i.e., the section perpendicular to the axis of the stair-shaped salvaging hole) is circular. However, in the embodiment of the invention, the stair-shaped salvaging hole may also be a hole of other shapes, and the shape of the cross section of the stair-shaped salvaging hole is not limited in the invention. The large-caliber section 111 is located at the bottom of the stair-shaped salvaging hole, and a hooking face 113 facing the bottom of the large-caliber section 111 is formed at the jointing part between the large-caliber section 111 and the small-caliber section 112, for being hooked by the clamping piece, which is in unfolded state, on the salvaging head of the petroleum instrument salvaging device.

In the embodiment of the invention, a sand outlet 116 is set at the bottom of the sidewall of the large-caliber section 111. During drilling, after the slurry enters the stair-shaped salvaging hole, solid particles will be flushed out from the sand outlet 116 during the flowing of the slurry. The number of the sand outlet 116 may be one, or it may be more than one. As shown in FIG. 3, the number of the sand outlets 116 is three, and they are distributed uniformly along the circumference of the large-caliber section 111. The number of the sand outlets 116 is not limited in the embodiments of the invention. Of course, the shape of the sand outlet 116 is not limited in embodiments of the invention either, and the sand outlet 116 may be a circular hole, or a strip-shaped hole.

In the petroleum instrument salvaging connector according to the embodiment of the invention, by setting a sand outlet 16 at the bottom of the sidewall of the large-caliber section 111 at the bottom of the stair-shaped salvaging hole, the slurry that enters the stair-shaped salvaging hole during a drilling process will be discharged, and solid particles deposited in the stair-shaped salvaging hole can be discharged due to the impact effect of the slurry discharge, thereby it can be avoided that solid particles are deposited in the stair-shaped salvaging hole. Thus, it may be seen that, by employing the petroleum instrument salvaging connector according to the invention, the problem in the current drilling process can be solved that the salvaging head cannot be in hooking fit with the petroleum instrument salvaging connector due to the deposition of solid particles in the slurry in the stair-shaped salvaging hole of the petroleum instrument salvaging connector.

Preferably, for facilitating the insertion rod on the salvaging head of the petroleum instrument salvaging device to drive the clamping piece to enter the stair-shaped salvaging hole, the stair-shaped salvaging hole according to the embodiment of the invention has a coniform opening 118 on the top end thereof. More preferably, in the embodiment of the invention, the length of the small-caliber section 112 should be as short as possible so as to make the clamping pieces on the salvaging head be in a retracted state when passing through and not be too long. Specifically, the ratio of the length of the small-caliber section 112 to the length of the large-caliber section 111 is 1:5 or 1:10. However, the above length ratio of the small-caliber section 112 to the large-caliber section 111 is only a preferred example, and it will not be specifically limited in the embodiment of the invention.

During the salvaging of a petroleum instrument, the salvaging head may be damaged in some cases, thus it cannot be in hooking fit with the hooking face 113 of the stair-shaped salvaging hole. Apparently, this will influence the salvaging of the petroleum instrument. Therefore, the petroleum instrument salvaging connector according to the embodiment of the invention may further include a pulley 12, which is set on the salvaging connector body 11, for fitting a lifting rope to assist the salvaging or hoisting of the petroleum instrument. The wheel rim of the pulley 12 has a groove for being pass through by the lifting rope. The lifting rope of the petroleum instrument salvaging system passes through the groove and fits the pulley 12 to realize the salvaging of the petroleum instrument. Specifically, the pulley 12 may be made of a metal material. Preferably, the pulley 12 may be made of a beryllium copper material.

In order to improve the stability of salvaging, there may be a plurality of pulleys 12 that are arranged in parallel. However, the number of the pulley 12 may also be one. Referring to FIG. 4, one embodiment of the invention provides a specific mounting mode for the pulley 12. Wherein, an accommodation hole 114 is set on the salvaging connector body 11; the pulley 12 is located in the accommodation hole 114, and the opposite parts on both sides of the wheel rim thereof extend outside the accommodation hole 114. In order to facilitate the passing of the lifting rope, in the embodiment of the invention, the distance from the wheel rim of the pulley 12 to the bottom end of the accommodation hole 114 is greater than the distance to the top end of the accommodation hole 114. Specifically, the salvaging connector body 11 is also set with a through hole 115 that penetrates the accommodation hole 114, and the pulley 12 is fixed on the salvaging connector body 11 via a screw-threaded connecting member 13 that passes through the through hole 115. The pulley 12 may also be mounted on the salvaging connector body 11 in other mounting modes, and it will not be limited in the embodiment of the invention.

Based on the petroleum instrument salvaging connector according to the embodiment of the invention, one embodiment of the invention further provides a petroleum instrument, which has the petroleum instrument salvaging connector disclosed in any one of the embodiments of the invention.

Referring again to FIG. 2, the other end of the salvaging connector body 11 that is opposite to the stair-shaped salvaging hole is set with a module mounting hole 117, which is used for connecting the salvaging connector with other modules of the petroleum instrument.

It should be noted that, the beneficial effects of the petroleum instrument according to the embodiment of the invention is brought about by the petroleum instrument salvaging connector according to the embodiment of the invention, and specific reference may be made to the description of the corresponding part in the above embodiments of the invention, which will not be described again here.

It should be noted that, the salvaging connector according to the embodiment of the invention may also be applicable for the salvaging of an instrument under a drilling well during the drilling process of other fields, for example, coal drilling, etc., rather than being limited to the field of petroleum.

Each embodiment in this specification is described in a stepped mode, and reference may be made to each other for the same or similar parts among the embodiments. Each embodiment emphasizes a different part from other embodiments.

The above embodiments of the invention will not limit the protection scope of the invention. Any modifications, equivalent substitutions and improvements made without departing from the spirit and principle of the invention will fall into the protection scope of the invention.

What is claimed is:

1. A petroleum instrument salvaging connector, which is set on a salvage end of a petroleum instrument, for being in hooking fit with a salvaging head of a petroleum instrument salvaging device, wherein:

the petroleum instrument salvaging connector comprises a salvaging connector body (11);

the salvaging connector body (11) has a stair-shaped salvaging hole; the stair-shaped salvaging hole is a blind hole and comprises a large-caliber section (111) and a small-caliber section (112);

the large-caliber section (111) is located at the bottom of the stair-shaped salvaging hole, and a hooking face (113) facing the bottom of the large-caliber section (111) is formed at a jointing part between the large-caliber section (111) and the small-caliber section (112);

a sand outlet (116) is set at the bottom of the sidewall of the large-caliber section (111); and the petroleum instrument salvaging connector further comprises a pulley (12), which is set on the salvaging connector body (11), for fitting a lifting rope to assist the salvaging or hoisting of the petroleum instrument, and the wheel rim of the pulley (12) has a groove for being passed through by the lifting rope.

2. The petroleum instrument salvaging connector according to claim 1, wherein, the number of the sand outlets (116) is greater than one, and the sand outlets (116) are distributed uniformly on the circumference of the large-caliber section (111).

3. The petroleum instrument salvaging connector according to claim 2, wherein, each sand outlet (116) is a strip-shaped hole.

4. The petroleum instrument salvaging connector according to claim 1, wherein, the pulley (12) is made of a beryllium copper material.

5. The petroleum instrument salvaging connector according to claim 1 or 4, wherein, there is one pulley, an accommodation hole is set on the salvaging connector body, the pulley is located in the accommodation hole, and wherein the wheel rim thereof extends outside the accommodation hole.

6. The petroleum instrument salvaging connector according to claim 4, wherein, the distance from the wheel rim of the pulley to the bottom end of the accommodation hole is greater than the distance to the top end of the accommodation hole.

7. A petroleum instrument, comprising the petroleum instrument salvaging connector according to any one of the above claims 1-3.

* * * * *